Patented June 12, 1928.

1,673,107

UNITED STATES PATENT OFFICE.

JOSEPH G. DONALDSON AND HENRY L. COLES, OF HAMILTON, OHIO, ASSIGNORS TO GUARDIAN METALS COMPANY, OF HAMILTON, OHIO, A CORPORATION OF DELAWARE.

REFRACTORY MATERIAL.

No Drawing. Original applications filed November 17, 1922, Serial No. 601,616, and January 16, 1925, Serial No. 2,864. Divided and this application filed July 3, 1926. Serial No. 120,518.

The subject matter of this invention was originally disclosed in the applications for Letters Patent of Joseph G. Donaldson and Henry L. Coles, S. N. 601,616, filed Nov. 17, 1922, and Serial No. 2,864, filed January 16, 1925, and entitled Refractory materials.

This invention relates to steel and other metals suitable for use in the safe and vault industry, particularly metals which will resist penetration by the drill or by the local application of heat (as by the blow torch) or both. In a previous application of Joseph G. Donaldson, Serial No. 478,220, filed June 17, 1921, entitled Metallic articles of manufacture and method of producing the same, we have described metals containing cores of highly refractory material, which cores are encompassed in metal and preferably alloyed or united thereto. In our present invention we describe an improved material which may be utilized in the same way, i. e., as a core encompassed in metal. We do not, however, limit ourselves to the use of this material as a "core" as the same has many commercial uses outside of its use as a core material.

We have found that highly refractory materials can be formed by taking a high-melting point oxide—such as the oxide of zirconium—and binding this together with a suitable binder such as a high-melting point silicate. Zirconium silicate has been found to give excellent results for this purpose. Preferably these materials should be finely comminuted and thoroughly mixed. They should then be placed in an electric furnace and heated for a sufficient length of time to permit the whole mass to become thoroughly fused.

Instead of adding the zirconium silicate as such, we have obtained excellent results by adding to the zirconium oxide approximately 9 to 11% silicon dioxide. When these substances have been comminuted and thoroughly mixed, the silicon dioxide and zirconium dioxide form zirconium silicate which, being in contact with an excess of zirconium dioxide, forms mixed crystals with the same and acts as a binder for the entire mass. To either of the above substances we have found it highly advantageous to add from 7 to 10 per cent of carbon in a suitable form, such as graphite. A typical formula covering such a mixture is as follows:

|  | Per cent. |
| --- | --- |
| Graphite | 7½ to 9½ |
| Silicon dioxide ($SiO_2$) | 9 to 11 |
| Zirconium dioxide ($ZrO_2$) | 80½ to 82½ |

It is our present belief that the silicon dioxide should not exceed 12% of the entire formula.

Ores containing zirconia or zirconium silicate not infrequently carry impurities of iron and titanium oxide. We have found that these materials are detrimental to the formula and that the best results are obtained when either of these impurities constitutes less than 1% of the formula. The addition of carbon to the formula adds very greatly to the resistance of the finished material. This is doubtless brought about by the fact that the carbon forms metallic carbides which are present as crystals or in solid solution.

When the material herein described is used as a core, it is given a suitable size and shape and combined with a suitable metal, such as steel, as by being encased wholly or partially therein. The core is preferably placed in a mould, metal (such as steel) being poured around it, as described in our former application. Thereupon the core material and encompassing material are brought into permanent union by the alloying action which takes place at and adjacent to the areas in contact. The mass so alloyed is more highly resistant to penetration either by the drill or by the torch than any other parts of the material not subject to such alloying action. In the matter of attempt to penetrate by means of the localized application of high heat, an important factor is the capacity of the material to conduct the heat away from the point of attack, thereby, in effect, diminishing the available cutting or fusing power of the torch. Refractory materials, of the type described, are excellent non-conductors of heat when cold but become conductors of heat when raised to a high temperature and thus serve to dissipate the heat.

Cores containing a large proportion of zirconia have been found to shrink considerably when the same are cooled. To overcome this objection, we frequently break up the core after the first melting and remelt same. The core formed by this second fusion will be found to be practically free from shrinkage cracks and to be more coherent than those cores which have been fused only once. These cores can be put in in strata which may be continuous throughout the metal or they may be placed in blocks which are set in staggered courses or the material may be broken into any desired size or the core may be formed by binding together with a suitable binder the broken pieces, all as set forth in our previous application. In any event, the cores, made as herein described, are intensely hard and impenetrable by the drill. They are also substantially immune from attack by the blow torch. Furthermore, the core material, being a non-conductor of electricity, it is impossible to penetrate the same by means of the local application of the electric arc.

Having now described our invention, what we claim and desire to secure by Letters Patent is:—

A refractory material comprising more than 85% of zirconium dioxide, less than 15% of silicon dioxide, and less than 10% carbon, the carbon being dissolved in the silicate formed during fusing of the oxides.

This specification signed this 29 day of June, 1926.

JOSEPH G. DONALDSON.
HENRY L. COLES.